United States Patent
Kwon et al.

(10) Patent No.: US 9,804,452 B2
(45) Date of Patent: Oct. 31, 2017

(54) LIQUID CRYSTAL DISPLAY HAVING IMPROVED PERFORMANCE AND MANUFACTURABILITY

(71) Applicant: Samsung Display Co., Ltd., Yongin, Gyeonggi-Do (KR)

(72) Inventors: Oh Jeong Kwon, Hwaseong-si (KR); Sung Jae Yun, Hwaseong-si (KR); Hyeok Jin Lee, Seongnam-si (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/705,791

(22) Filed: May 6, 2015

(65) Prior Publication Data

US 2016/0109764 A1   Apr. 21, 2016

(30) Foreign Application Priority Data

Oct. 15, 2014 (KR) ........................ 10-2014-0139241

(51) Int. Cl.
*G02F 1/1337* (2006.01)
*G02F 1/1343* (2006.01)

(52) U.S. Cl.
CPC .. *G02F 1/134336* (2013.01); *G02F 1/133707* (2013.01); *G02F 2001/134345* (2013.01)

(58) Field of Classification Search
None
See application file for complete search history.

(56) References Cited

U.S. PATENT DOCUMENTS

| 2006/0261335 A1* | 11/2006 | Nakahori | G02F 1/133555 257/59 |
| 2007/0202253 A1* | 8/2007 | Ong | C23C 16/0209 427/248.1 |
| 2010/0195034 A1* | 8/2010 | Lee | G02F 1/133753 349/124 |
| 2011/0096257 A1* | 4/2011 | Ting | G02F 1/136213 349/38 |

(Continued)

FOREIGN PATENT DOCUMENTS

| KR | 10-2013-0104224 A | 9/2013 |
| KR | 10-2013-0104521 A | 9/2013 |
| KR | 10-2014-0021749 A | 2/2014 |

*Primary Examiner* — Richard Kim
(74) *Attorney, Agent, or Firm* — Innovation Counsel LLP

(57) ABSTRACT

A liquid crystal display (LCD) according to an exemplary embodiment of the present invention includes: a first insulation substrate; a lower electrode disposed on the first insulation substrate; a second insulation substrate facing the first insulation substrate; an upper electrode disposed on the second insulation substrate and facing the lower electrode; and a liquid crystal layer disposed between the lower electrode and the upper electrode. The lower electrode forms one unit region, the unit region includes a plurality of subregions, and the lower electrode includes: a first lower electrode including a central pattern disposed at a center of a border between each pair of adjacent subregions, and a plurality of micro branch portions that are coupled to the central pattern, the micro branch portions of two different subregions extending in different directions; and a second lower electrode having intersecting elongated portions that each extend along parts of the border.

14 Claims, 20 Drawing Sheets

(56) References Cited

U.S. PATENT DOCUMENTS

| | | | |
|---|---|---|---|
| 2012/0147282 A1* | 6/2012 | Shin | G02F 1/13624 |
| | | | 349/38 |
| 2013/0194536 A1* | 8/2013 | Tae | G02F 1/133707 |
| | | | 349/143 |
| 2013/0321740 A1 | 12/2013 | An et al. | |
| 2015/0248038 A1* | 9/2015 | Zhang | G02F 1/133514 |
| | | | 257/390 |

* cited by examiner

LIQUID CRYSTAL DISPLAY HAVING IMPROVED PERFORMANCE AND MANUFACTURABILITY

CROSS-REFERENCE TO RELATED APPLICATION

This application claims priority to, and the benefit of, Korean Patent Application No. 10-2014-0139241 filed in the Korean Intellectual Property Office on Oct. 15, 2014, the entire contents of which are incorporated herein by reference.

BACKGROUND (a) Field

Embodiments of the present invention relate generally to liquid crystal displays. More specifically, embodiments of the present invention relate to liquid crystal displays having improved performance and manufacturability.

(b) Description of the Related Art

As one of the most widely used flat panel displays at present, a liquid crystal display (LCD) includes two display panels on which field generating electrodes such as a pixel electrode and a common electrode are formed, and a liquid crystal layer interposed between the two display panels.

The liquid crystal display (LCD) displays an image by generating an electric field in a liquid crystal layer by applying a voltage to the field generating electrodes, determining alignment directions of liquid crystal molecules of the liquid crystal layer using the generated field, and controlling polarization of incident light.

Among the LCDs, a vertically aligned mode LCD, in which liquid crystal molecules are aligned so that their long axes are perpendicular to the upper and lower panels while no electric field is applied, has been the focus of much attention because its contrast ratio is high and a wide reference viewing angle is relatively easily implemented.

In such a vertical alignment mode LCD, a plurality of domains in which alignment directions of liquid crystals are different may be formed in one pixel to implement a wide viewing angle.

As a means of forming the plurality of domains as such, there is a method of forming cutouts such as slits and the like in the field generating electrodes. Using this method, the liquid crystals are rearranged by a fringe field generated between edges of the cutouts and the field generating electrodes facing the edges thereof, thereby forming the plurality of domains.

As examples of LCDs having these domains, there are a VA mode LCD in which upper and lower substrates both are patterned using a domain-forming means, a patternless VA mode LCD in which a micro pattern is not formed in an upper substrate but is formed only in a lower substrate, and the like. A display area is divided into a plurality of domains by the domain-forming means, and the liquid crystals of each domain are generally tilted in the same direction.

Recently, an initial alignment method in which the liquid crystals have pretilts in the absence of an electric field has been proposed to improve a response speed of the liquid crystals as well as to implement a wide viewing angle. An alignment layer having various alignment directions may be used to allow the liquid crystals to have the pretilts in various directions, or an alignment aid for allowing the liquid crystals to be pretilted in the liquid crystal layer is added and an electric field is then applied to the liquid crystal layer such that the alignment aid is hardened. The alignment aid is then hardened by heat or light such as ultraviolet rays and the like, and may allow the liquid crystals to be pretilted in a predetermined direction.

In this case, the voltage is applied to each of the electric field generating electrodes to generate the electric field in the liquid crystal layer. However, since the alignment aid requires an ultraviolet (UV) curing process or the like, use of an alignment aid requires that an additional process is added to the LCD manufacturing process. Therefore, a new process line is required and thus an additional cost is incurred. Accordingly, manufacturing cost of the LCD becomes higher, additional manufacturing equipment is needed, and the manufacturing process becomes more complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention have been made in an effort to provide a liquid crystal display (LCD) with enhanced liquid crystal control and high transmittance that can be manufactured at a low cost, with a simpler manufacturing process, and without additional equipment.

Further, embodiments of the present invention have been made in an effort to provide a curved display device having reduced instances of an abnormality such as texture or smudges due to misalignment.

A liquid crystal display (LCD) according to an exemplary embodiment of the present invention includes: a first insulation substrate; a lower electrode disposed on the first insulation substrate; a second insulation substrate facing the first insulation substrate; an upper electrode disposed on the second insulation substrate and facing the lower electrode; and a liquid crystal layer disposed between the lower electrode and the upper electrode. The lower electrode forms one unit region, the unit region includes a plurality of subregions, and the lower electrode includes: a first lower electrode including a central pattern disposed at a center of a border between each pair of adjacent subregions, and further including a plurality of micro branch portions that are coupled to the central pattern, wherein the micro branch portions of two different subregions extend in different directions; and a second lower electrode having intersecting elongated portions that each extend along parts of the border.

The LCD further may include a passivation layer disposed between the first and second lower plate unit electrodes, wherein the first and second lower plate unit electrodes may have the same voltage applied thereto.

The first and second lower plate unit electrodes may be electrically connected through one or more contact holes.

The LCD may further include: a gate line and a data line that are disposed on the insulation substrate, insulated from each other, and that cross each other; and a thin film transistor coupled to the gate and data lines, wherein the lower electrode may be coupled to the thin film transistor.

The passivation layer may satisfy the following:

$$\frac{V_{lc}}{V_{applied}} = \left(1 + \frac{d_p/d_{lc}}{\varepsilon_p/\varepsilon_{lc}}\right)^{-1}$$

wherein $V_{lc}$ is an effective voltage of the liquid crystal layer, $V_{applied}$ is a voltage applied to the liquid crystal layer, $d_p$ is a thickness of the passivation layer, $d_{lc}$ is a thickness of the liquid crystal layer, $\in_p$ is a dielectric constant of the passivation layer, and $\in_{lc}$ is a dielectric constant of the liquid crystal layer.

The passivation layer may have a voltage drop rate (Vlc/Vapplied) of less than about 0.8 to 0.95.

A thickness of the passivation layer may be about 2000 Å to 9000 Å.

The passivation layer may comprise silicon nitride ($SiN_x$).

A size of the central pattern may correspond to about 30% to 50% of the size of the lower electrode.

A width of the cross-shaped stem portion may be about 3 μm to 10 μm.

One pixel area may include a plurality of the unit regions, the pixel area may include a first subpixel and a second subpixel configured to respectively transmit light at identical or different luminance for one input image signal, the first and second subpixels may each include at least one of the lower electrode and the upper electrode, and the number of the lower p electrodes included in the second subpixel may be greater than the number of the lower electrodes included in the first subpixel.

The first and second subpixels may be spaced apart from each other with the gate line interposed therebetween.

The thin film transistor may include a first thin film transistor coupled to the first subpixel, and a second thin film transistor coupled to the second subpixel.

The LCD may further include a color filter and a light blocking member that are disposed on the data line.

The LCD may be curved.

The upper plate electrode may be a single unitary, continuous structure.

As described above, according to the exemplary embodiment of the present invention, an LCD with enhanced liquid crystal control and higher transmittance can be manufactured at lower cost, with a simpler manufacturing process, and without requiring additional equipment. In addition, when applied to the curved display device, display abnormalities such as texture or smudges due to misalignment can be reduced.

DETAILED DESCRIPTION OF THE EMBODIMENTS

Figure 1:
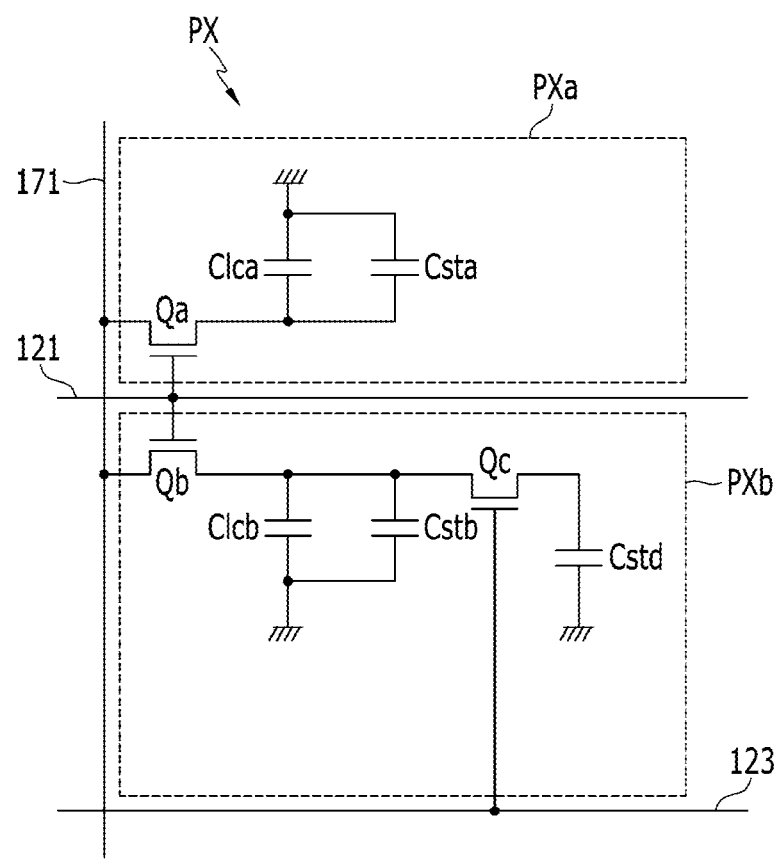
FIG. 1 is a circuit diagram according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, the thickness of layers, films, panels, regions, etc., are exaggerated for clarity. Accordingly, the figures are not necessarily to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
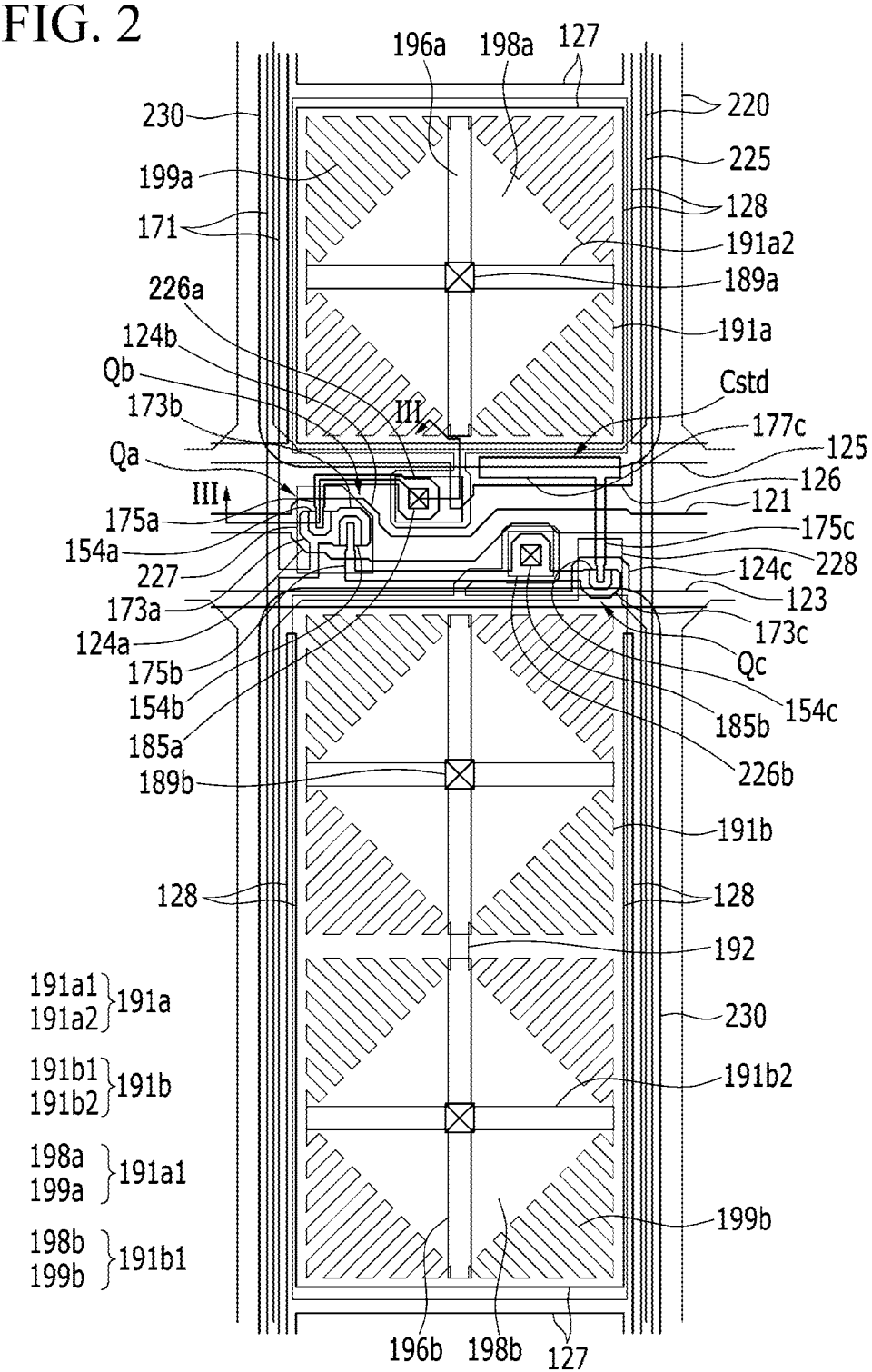
FIG. 2 is a top plan view of one pixel according to an exemplary embodiment of the present invention.
Figure 3:
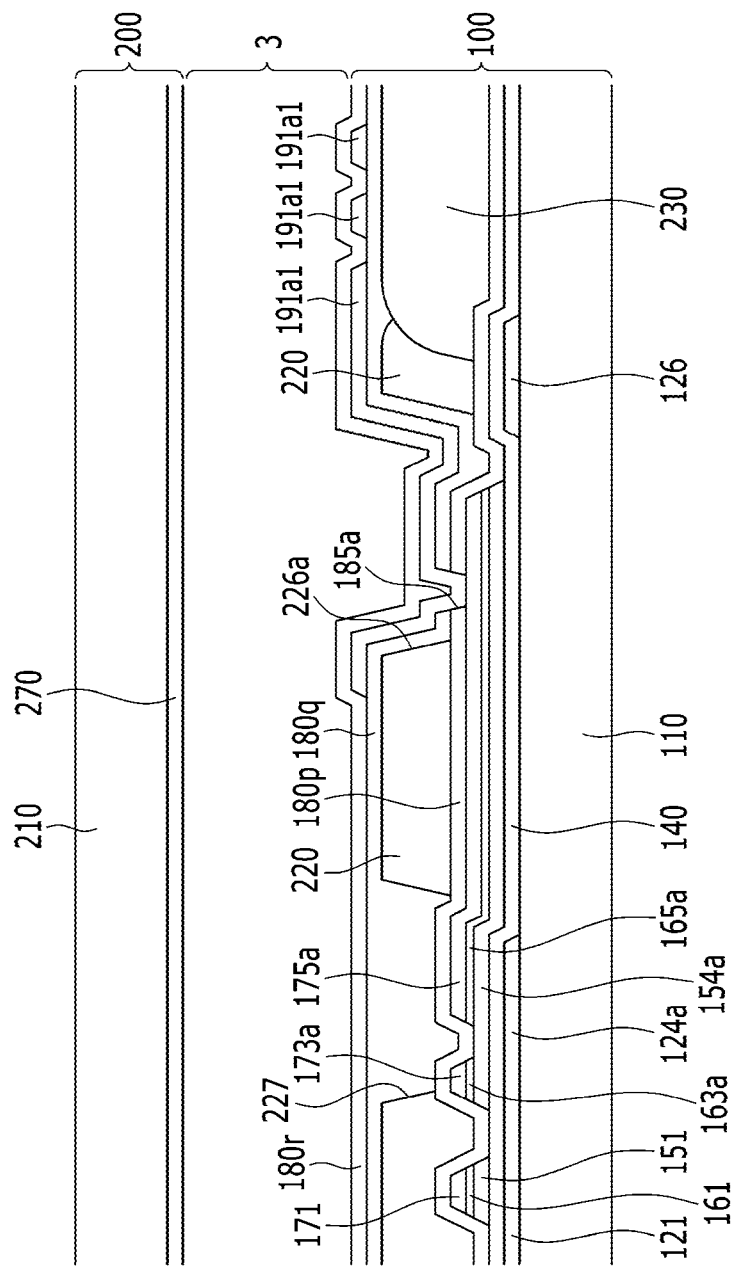
FIG. 3 is a cross-sectional view of FIG. 2 taken along the line III-III.

A liquid crystal display (LCD) according to an exemplary embodiment of the present invention will now be described with reference to FIGS. 1 to 3. FIG. 1 is an equivalent circuit diagram of one pixel of an LCD according to the exemplary embodiment of the present invention, FIG. 2 is a top plan view of one pixel of the LCD according to the exemplary embodiment of the present invention, and FIG. 3 is a cross-sectional view of the LCD of FIG. 2 taken along the line III-III.

Referring to FIG. 1, the LCD according to the exemplary embodiment of the present invention has signal lines including a gate line 121, a step-down gate line 123, and a data line 171; as well as a pixel PX coupled thereto.

Each pixel PX includes first and second subpixels PXa and PXb. The first subpixel PXa includes a first switching element Qa, a first liquid crystal capacitor Clca, and a first storage capacitor Csta. The second subpixel PXb includes second and third switching elements Qb and Qc, a second liquid crystal capacitor Clcb, a second storage capacitor Cstb, and a step-down capacitor Cstd.

The first and second switching elements Qa and Qb are respectively coupled to the gate line 121 and the data line 171, and the third switching element Qc is coupled to the step-down gate line 123. The first and second switching elements Qa and Qb are three-terminal elements such as a thin film transistor (TFT) and the like. Control terminals thereof are coupled to the gate line 121, input terminals thereof are coupled to the data line 171, and output terminals thereof are respectively coupled to the first and second liquid crystal capacitors Clca and Clcb and also respectively coupled to the first and second storage capacitors Csta and Cstb.

The third switching element Qc is also a three-terminal element such as a TFT and the like. A control terminal thereof is coupled to the step-down gate line 123, an input terminal thereof is coupled to the second liquid crystal capacitor Clcb, and an output terminal thereof is coupled to the step-down capacitor Cstd.

The step-down capacitor Cstd is coupled to the output terminal of the third switching element Qc and a common voltage.

An operation of the pixel PX will now be described. When a gate-on voltage is applied to the gate line 121, the first and second switching elements Qa and Qb are turned on. Accordingly, a data voltage of the data line 171 is applied to the first and second liquid crystal capacitors Clca and Clcb through the turned-on first and second switching elements Qa and Qb, and the first and second liquid crystal capacitors Clca and Clcb are charged by a difference between the data voltage and the common voltage. In this case, a gate-off voltage is applied to the step-down gate line 123.

Next, when the gate-on voltage is applied to the step-down gate line 123 at the same time that the gate-off voltage is applied to the gate line 121, the first and second switching elements Qa and Qb coupled to the gate line 121 are turned off, and the third switching element Qc is turned on. Accordingly, a charged voltage of the second liquid crystal capacitor Clcb coupled to the output terminal of the second switching element Qb decreases. Thus, when the LCD is driven in a frame inversion mode, the charged voltage of the second liquid crystal capacitor Clcb may always be lower than that of the first liquid crystal capacitor Clca. Accordingly, side visibility of the LCD can be improved by setting the charged voltages of the first and second liquid crystal capacitors Clca and Clcb to be different from one another.

The liquid crystal display having a circuit structure illustrated in FIG. 1 according to the exemplary embodiment of the present invention will now be described with reference to FIGS. 2 and 3. The same constituent elements as the exemplary embodiments described above designate the same reference numerals, and any redundant description will be omitted.

FIG. 2 is a top plan view of one pixel according to the exemplary embodiment of the present invention, and FIG. 3 is a cross-sectional view of the LCD of FIG. 2 taken along the line III-III.

The LCD according to this exemplary embodiment of the present invention includes a lower panel 100 and an upper panel 200 facing each other, and a liquid crystal layer 3 interposed between the two panels 100 and 200.

The lower panel 100 will be described first. A plurality of gate conductors including the gate line 121, the step-down gate line 123, and a storage electrode line 125 are disposed on a first insulation substrate 110. The gate line 121 and the step-down gate line 123 mainly extend in a horizontal direction to transmit a gate signal.

The gate line 121 may include a first gate electrode 124a and a second gate electrode 124b, and the step-down gate line 123 may include a third gate electrode 124c. The first and second gate electrodes 124a and 124b are coupled to each other.

The storage electrode line 125 may also mainly extend in the horizontal direction to transmit a predetermined voltage such as the common voltage Vcom and the like. The storage electrode line 125 may include a storage extension portion 126, a pair of vertical portions 128 extending upwardly (in the view of FIG. 2) and substantially perpendicular to the gate line 121, and a horizontal portion 127 for interconnecting the pair of vertical portions 128. However, the structure of the storage electrode line 125 is not limited thereto.

A gate insulating layer 140 is disposed on the gate conductor, and a semiconductor 151 is disposed thereon. The semiconductor 151 may mainly extend in a vertical direction in the view of FIG. 2, and may extend toward the first and second gate electrodes 124a and 124b. The semiconductor 151 includes first and second semiconductors 154a and 154b coupled to each other, and a third semiconductor 154c coupled to the second semiconductor 154b, although such coupling need not necessarily be present.

An ohmic contact 161 is disposed on the semiconductor 151, first ohmic contacts 163a and 165a are disposed on the first semiconductor 154a, and ohmic contacts may also be respectively disposed on the second and third semiconductors 154b and 154c. However, these ohmic contacts are not strictly required. For example, if the semiconductor 151 is formed of an oxide semiconductive material, the ohmic contacts 161, 163a, and 165a may be omitted.

Data conductors including the data line 171, a first drain electrode 175a, a second drain electrode 175b, and a third drain electrode 175c are disposed on the ohmic contacts 161, 163a, and 165a.

The data line 171 may include a first source electrode 173a and a second source electrode 173b that extend toward and over the first and second gate electrodes 124a and 124b. Rod-shaped end portions of the first and second drain electrodes 175a and 175b are partially enclosed by the first and second source electrodes 173a and 173b. One wide end portion of the second drain electrode 175b extends further to form a third source electrode 173c that is bent in a U-shape.

A wide end portion 177c of the third drain electrode 175c overlaps the storage extension portion 126 to form the step-down capacitor Cstd, and a rod-shaped end portion of the third drain electrode 175c is partially enclosed by the third source electrode 173c.

Along with the first/second/third semiconductors (154a/154b/154c), the first/second/third gate electrodes (124a/124b/124c), the first/second/third source electrodes (173a/173b/173c), and the first/second/third drain electrodes (175a/175b/175c) respectively and collectively form first/second/third thin film transistors (Qa/Qb/Qc).

A first passivation layer 180p is disposed on the data conductors 171, 175a, 175b, and 175c and exposed portions of the semiconductors 154a, 154b, and 154c, and a color filter 230 and a light blocking member 220 may be disposed thereon. The light blocking member 220 may include an opening 227 that is disposed on the first and second thin film transistors Qa and Qb, an opening 226a that is disposed on the wide end portion of the first drain electrode 175a, an opening 226b that is disposed on the wide end portion of the second drain electrode 175b, and an opening 228 that is disposed on the third thin film transistor Qc.

Alternatively, at least one of the color filter 230 and the light blocking member 220 may be disposed in the upper panel 200.

A second passivation layer 180q is disposed on the color filter 230 and the light blocking member 220.

A plurality of contact holes 185a and 185b are formed in the first and second passivation layers 180p and 180q to respectively expose the widened ends of the first and second drain electrodes 175a and 175b.

A lower plate electrode including the first and second subpixel electrodes 191a and 191b is disposed on the second passivation layer 180q. The first and second subpixel electrodes 191a and 191b may respectively include shapes shown in FIG. 4 and FIG. 5, which will be described later.

Particularly, when the first and second subpixel electrodes 191a and 191b are differently sized to improve side visibility, the first subpixel electrode 191a may include one lower plate unit electrode as does a lower plate electrode 191, and the second subpixel electrode 191b may include two lower plate unit electrodes.

In FIG. 2, an example in which the first subpixel electrode 191a includes one lower plate unit electrode and the second subpixel electrode 191b includes two lower plate unit electrodes is illustrated, but configurations of embodiments of the invention are not limited thereto.

The lower plate electrode may include a plurality of lower plate unit electrodes, and one lower plate unit electrode may include first lower plate unit electrodes 191a1 and 191b1 and second lower plate unit electrodes 191a2 and 191b2. In addition, one lower plate unit electrode forms one unit region, and the unit region may include a plurality of subregions associated with arrangements of the liquid crystal molecule. As an example, one unit region may include four subregions.

According to the exemplary embodiment of the present invention, the first lower plate unit electrodes 191a1 and 191b1 are disposed on the second passivation layer 180q, a third passivation layer 180r is disposed on the first lower plate unit electrodes 191a1 and 191b1, and the second lower plate unit electrodes 191a2 and 191b2 are disposed on the third passivation layer 180r.

In this case, the first lower plate unit electrodes 191a1 and 191b1 and the second lower plate unit electrodes 191a2 and 191b2 may have the same voltage applied thereto, and as an example, may be physically and electrically coupled through contact holes 189a and 189b disposed in the third passivation layer 180r such that they receive the same voltage.

However, configurations of the invention are not limited thereto, and the electrodes may instead be formed and connected, for example, through an alternative configuration.

The first lower plate unit electrodes 191a1 and 191b1 include center patterns 198a and 198b that are disposed to align with a center of a cross-shaped stem portion that defines an imaginary border between the plurality of subregions. A plurality of micro branch portions 199a and 199b are coupled to the center patterns 198a and 198b to extend in different directions within the two different subregions. The plurality of micro branch portions 199a and 199b extend from the center patterns 198a and 198b, as shown in FIG. 2.

Figure 5:
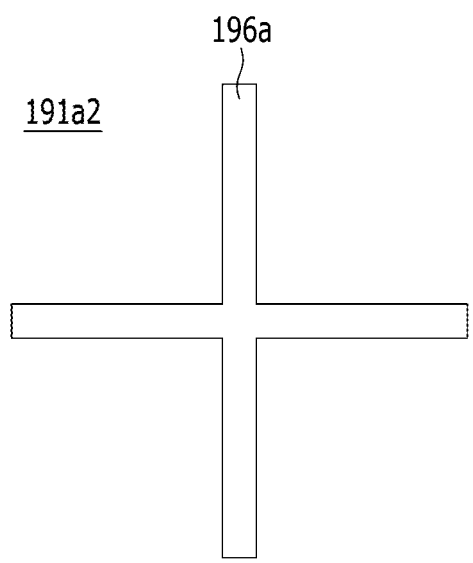
FIG. 5 is a top plan view of a unit electrode of a second lower panel according to the exemplary embodiment of the present invention.

As shown in FIG. 5, the second lower plate unit electrodes 191a2 and 191b2 include cross-shaped stem portions 196a and 196b that define the border between the plurality of subregions. That is, the imaginary border between the plurality of subregions included in the first lower plate unit electrodes 191a1 and 191b1 corresponds to the cross-shaped stem portions 196a and 196b of the second lower plate unit electrodes 191a2 and 191b2. The first lower plate unit electrodes 191a1 and 191b1 and the second lower plate unit electrodes 191a2 and 191b2 will be described later in further detail.

Meanwhile, the third passivation layer 180r according to the exemplary embodiment of the present invention may satisfy the following Equation 1, $$\frac{V_{lc}}{V_{applied}} = \left(1 + \frac{d_p/d_{lc}}{\varepsilon_p/\varepsilon_{lc}}\right)^{-1} \quad \text{(Equation 1)}$$

wherein $V_{lc}$ is an effective voltage of the liquid crystal layer, $V_{applied}$ is a voltage applied to the liquid crystal layer, $d_p$ is a thickness of the passivation layer, $d_{lc}$ is a thickness of the liquid crystal layer, $\varepsilon_p$ is a dielectric constant of the passivation layer, and $\varepsilon_{lc}$ is a dielectric constant of the liquid crystal layer.

A voltage drop rate ($V_{lc}/V_{applied}$) of the third passivation layer 180r may be between 0.8 and 0.95.

In the present embodiment, when the thickness of the liquid crystal layer ($d_{lc}$) and the dielectric constant ($\varepsilon_{lc}$) are fixed and the voltage drop rate ($V_{lc}/V_{applied}$) of the third passivation layer 180r has the aforementioned value range, the thickness of the passivation layer ($d_p$) and the dielectric constant of the passivation layer ($\varepsilon_p$) are variables in the Equation 1. In this case, when the third passivation layer 180r formed of a predetermined material is used to determine the dielectric constant of the passivation layer ($\varepsilon_p$), a range of the thickness ($d_p$) that the third passivation layer 180r can have is determined. As an example, the thickness of the third passivation layer 180r may be about 2000 Å to 9000 Å, particularly about 4000 Å.

Alternatively, when the third passivation layer 180r having a predetermined thickness ($d_p$) is used, the passivation layer 180r formed of a material having the corresponding dielectric constant can be selected because a range of the dielectric constant ($\varepsilon_p$) that the third passivation layer 180r should have is determined. As an example, the third passivation layer 180r may be formed of a silicon nitride ($SiN_x$).

The first subpixel electrode 191a may receive the data voltage from the first drain electrode 175a through the contact hole 185a, and the second subpixel electrode 191b receive the data voltage from the second drain electrode 175b through the contact hole 185b.

Next, the upper panel 200 will be described. An upper plate electrode 270 is disposed on a second insulation substrate 210. The upper plate electrode 270 disposed in each of the subpixels PXa and PXb may have a planar plate-shaped structure in which no pattern is included. That is, electrode 270 may be substantially a flat, rectangular conductor.

The first subpixel electrode 191a and the upper plate electrode 270, along with the liquid crystal layer 3 interposed therebetween, form the first liquid crystal capacitor Clca, and the second subpixel electrode 191b and the upper plate electrode 270, along with the liquid crystal layer 3 interposed therebetween, form the second liquid crystal capacitor Clcb, thereby maintaining the applied voltages even after the first and second thin film transistors Qa and Qb are turned off. In addition, the first and second subpixel electrodes 191a and 191b may overlap the storage electrode line 125 to form the first and second storage capacitors Csta and Cstb.

The lower plate electrode 191 of one pixel PX is applicable, for example, to exemplary embodiments in which a plurality of lower plate unit electrodes are included. The number of lower plate unit electrodes included in one pixel PX may be determined with consideration of the amount of liquid crystal control that is required for the structure and size of the pixel PX.

Figure 4:
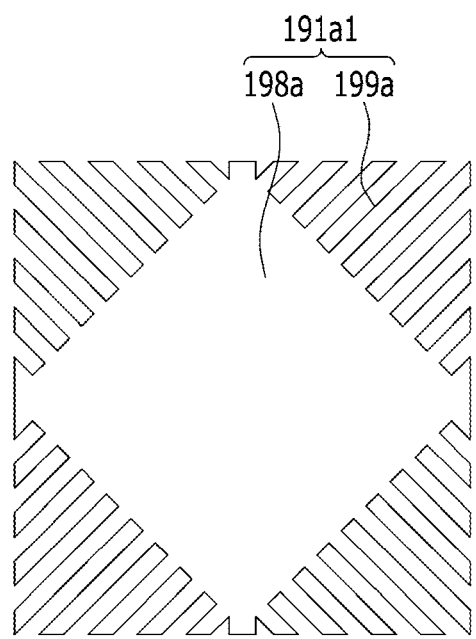
FIG. 4 is a top plan view of a unit electrode of a first lower panel according to the exemplary embodiment of the present invention.
Figure 6:
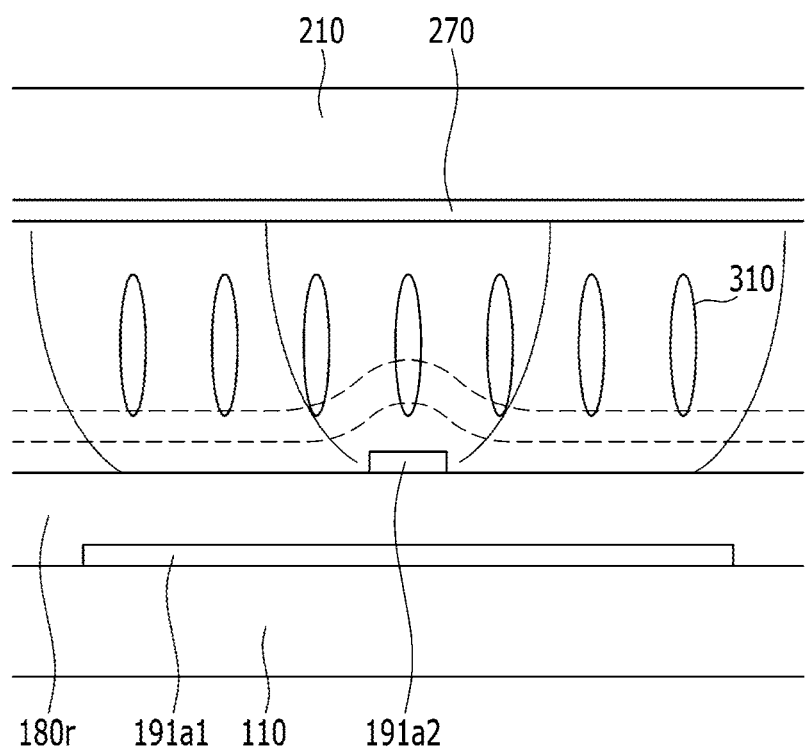
FIG. 6 is a cross-sectional view of an equipotential line for some constituent elements of the exemplary embodiment of the present invention.

The lower plate unit electrode according to the exemplary embodiment of the present invention will now be described in detail with reference to FIGS. 4 to 6. FIG. 4 is a top plan view of a unit electrode of a first lower panel according to the exemplary embodiment of the present invention, FIG. 5 is a top plan view of a unit electrode of a second lower panel according to the exemplary embodiment of the present invention, and FIG. 6 is a cross-sectional view of an equipotential line for some constituent elements of the exemplary embodiment of the present invention. In the following, a description will be made based on the first subpixel electrode, but the description will be applicable to the second subpixel electrode as well.

Referring to FIG. 4, the first lower plate unit electrode 191a1 of one pixel PX includes the center pattern 198a whose area center is aligned with a center portion of the cross-shaped stem portion 196a of the second lower plate unit electrode 191a2.

As an example, when the center pattern 198a has a rhombus shape, each edge side may form an oblique angle with respect to a direction of extension of the cross-shaped stem portion 196a. More specifically, each side of the center pattern 198a may be perpendicular to the direction of extension of the corresponding micro branch portions 199a.

As such, if the first lower plate unit electrode 191a1 includes the center pattern 198a positioned at the center of the cross-shaped stem portion 196a of the second lower plate unit electrode 191a2, liquid crystal control may be enhanced by a fringe field that is generated by the sides of the center pattern 198a. Accordingly, smudges due to texture can easily be removed after external pressure is released or texture generation can be suppressed.

In addition, the first lower plate unit electrode 191a1 includes the micro branch portions 199a that extend from the center pattern 198a. Control of the liquid crystal can be enhanced using the fringe field that is generated by the micro branch portions 199a.

A size (i.e., upper surface area) of the center pattern 198a according to the exemplary embodiment of the present invention may correspond to about 30% to 50% of the size (upper surface area) of the first lower plate unit electrode 191a1.

Since lengths of the micro branch portions 199a are constrained by the limited size of the first lower plate unit electrode 191a1, the micro branch portions 199a decrease in length as the size of the center pattern 198a increases. Thus, sizing the center pattern 198a also determines the lengths of micro branch portions 199a, so that the sizes of each can be appropriately adjusted to further reduce smudge generation due to external pressure.

As shown in FIG. 5, the second lower plate unit electrode 191a2 includes the cross-shaped stem portion 196a corresponding to an imaginary cross-shaped border separating the plurality of subregions of the first lower plate unit electrode 191a1. A width of the cross-shaped stem portion 196a may have a predetermined range for liquid crystal control, and as an example, may be about 3 μm to 10 μm.

Meanwhile, referring to FIG. 2, a plurality of first lower plate unit electrodes 191b1 may be coupled to each other through a connecting portion 192. The connecting portion 192 may be disposed on an extending line of the imaginary border that is included in the first lower plate unit electrode 191b1. That is, connecting portion 192 may connect two electrodes 191b1 collinear with their corresponding stem portion 196b. A horizontal gap is provided in a space between the first lower plate unit electrodes 191b1 that are adjacent to each other in a column direction, that is, in the vertical direction. The connecting portion 192 may cross this horizontal gap.

Similarly, a plurality of second lower plate unit electrodes 191b2 may be coupled to each other through a connecting portion (not shown). That is, the cross-shaped stem portions 196b of the second lower plate unit electrodes 191b2 neighboring each other in a row or column direction may face each other to be coupled to each other. More specifically, end portions of the cross-shaped stem portions 196b of the second lower plate unit electrodes 191b2 may be coupled to each other to form the connecting portion, but the connecting portion is not limited to being formed as such and may be formed elsewhere in each unit pixel.

FIG. 6 is a cross-sectional view of the equipotential lines for some constituent elements of exemplary embodiments of the present invention. The liquid crystal layer according to this exemplary embodiment of the present invention has no pretilt, and the equipotential lines are formed along the cross-shaped stem portion 196a of the second lower plate unit electrode 191a2 that is disposed at the center of the center pattern and that corresponds to the imaginary border between the plurality of subregions (refer to FIG. 6).

A liquid crystal layer having no pretilt may help control texture generation due to misalignment of the upper and lower substrates, even if it is applied to a curved display device. In addition, the liquid crystal layer is controlled by the equipotential lines, and in particular, liquid crystal molecules 310 are controlled by the second lower plate unit electrode 191a2 that is disposed at the center of the center pattern controls, thereby allowing the liquid crystal layer to be easily controlled across an entire surface of the display device.

Images for cases in which an exemplary embodiment of the present invention and a comparative example are applied to a curved display device will now be described with reference to FIGS. 7 to 9.

Figure 7A:
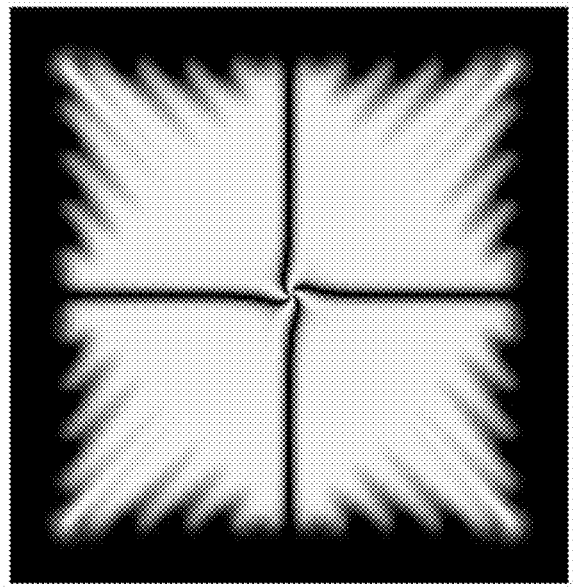
FIGS. 7A to 7B are images of the unit electrode according to the exemplary embodiment of the present invention.
Figure 7B:
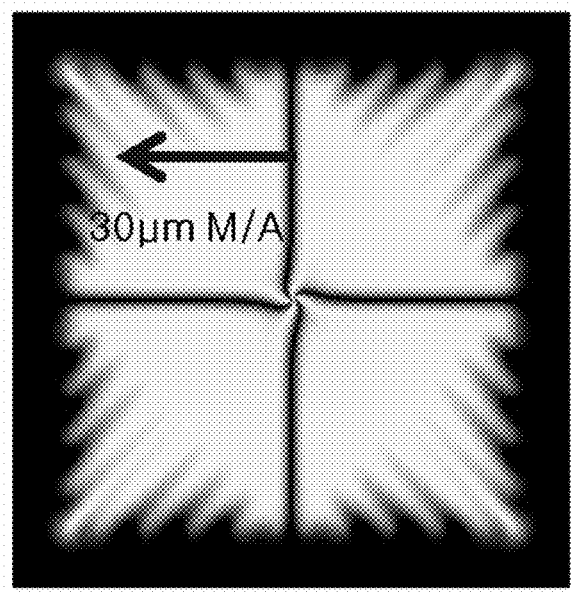
Figure 8A:
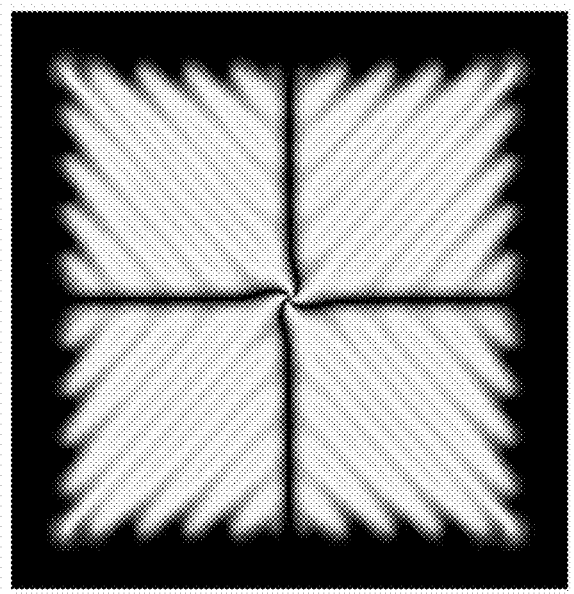
FIGS. 8A, 8B, 9A, and 9B are images of unit electrodes according to comparative examples.
Figure 8B:
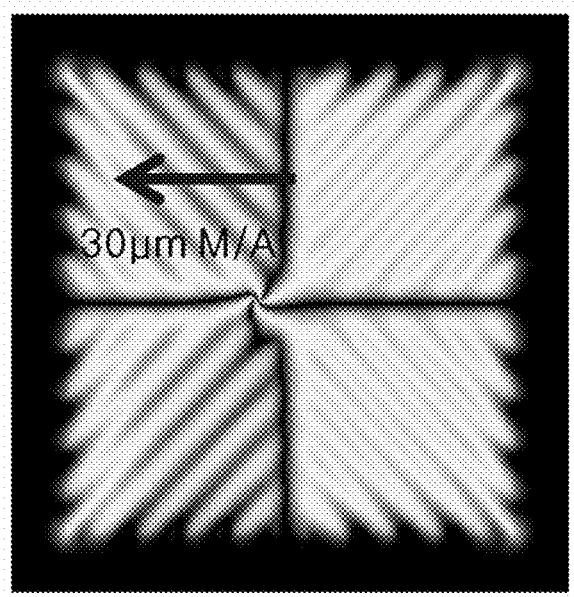
Figure 9A:
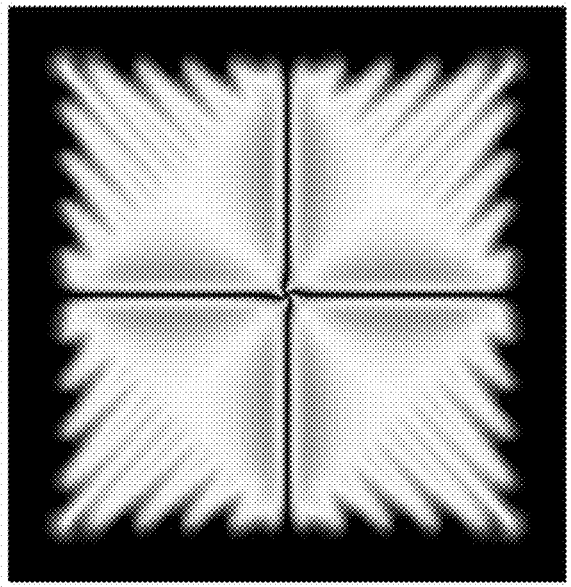
Figure 9B:
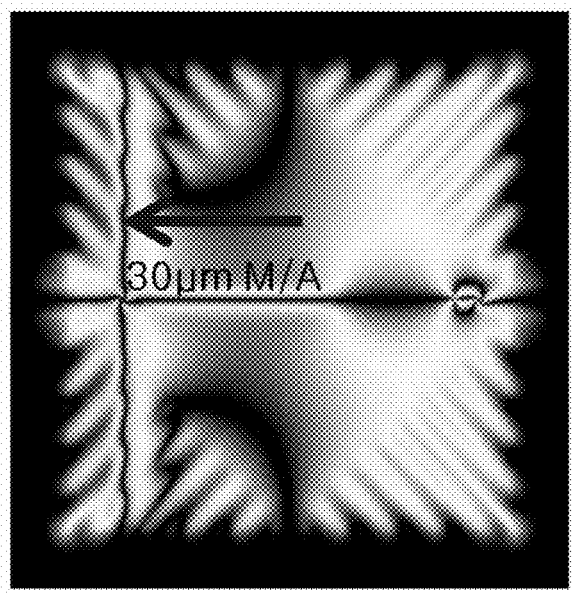

FIGS. 7A to 7B are images of the unit electrode fabricated according to an exemplary embodiment of the present invention, and FIGS. 8A to 9B are images of unit electrodes according to comparative examples. Specifically, FIGS. 7A and 7B illustrate an exemplary embodiment of the present invention including the first lower plate unit electrode, the second lower plate unit electrode, and the plate-shaped upper electrode. FIGS. 8A and 8B illustrate a comparative example in which a lower plate unit electrode includes only micro branch portions and a liquid crystal layer is pretilted. FIGS. 9A to 9B illustrate a comparative example including a lower plate unit electrode with a center pattern and micro branch portions, and an upper plate electrode having a cross-shaped opening.

First, FIG. 7A illustrates an image of the upper and lower plate unit electrodes according to the exemplary embodiment applied to a flat panel display, and FIG. 7B illustrates an image of the upper and lower plate unit electrodes applied to a bent or curved display device. Even if the upper and lower plate electrodes are misaligned due to bending as shown in FIG. 7B as well as the case of FIG. 7A, texture generation due to this misalignment can be controlled since the upper plate electrode does not include any pattern and the liquid crystal layer includes no pretilt.

Meanwhile, in the comparative example applied to the flat panel display as shown in FIG. 8A, the texture generation can also be controlled as shown in FIG. 7A. In contrast, FIG. 8B shows a comparative example of a display device with a pretilted liquid crystal layer, which has also been bent or curved. Here, a considerable amount of texture due to misalignment is generated, as can be seen in FIG. 8B. Particularly, in FIG. 8B, a considerable amount of texture is generated as the upper substrate is pushed leftward.

Next, when the comparative example including the upper panel unit electrode with a cross-shaped opening is applied to the flat panel display, it can be seen that there is no texture generation at all, as can be seen in FIG. 9A. However, when the comparative example is applied to the curved display device as shown in FIG. 9B, it can be seen that, as the substrate is curved, misalignment occurs between the center pattern of the lower substrate and the opening of the upper substrate, and thus a considerable amount of texture is generated.

Thus, the exemplary embodiment of the present invention has the benefit of being applicable to both a flat panel display and a curved display, by suppressing texture generation due to the misalignment.

A rate of luminance variations of the exemplary embodiment and the comparative examples of FIGS. 7 to 9 will now be described with reference to FIG. 10.

According to the exemplary embodiment of the present invention, in a case 1 in which the lower plate unit electrode includes a first lower plate unit electrode including the center pattern and the micro branch portions, and a second lower plate unit electrode including the cross-shaped stem portion, no visible luminance variation is observed even if the voltage increases.

However, in a case a of FIGS. 8A and 8B in which the pretilted liquid crystal layer and the lower plate unit electrode including the micro branch portions are included, a considerable amount of luminance variation is observed when the voltage exceeds about 2 V. Similarly, as shown in FIGS. 9A and 9B, in a case b in which a lower plate unit electrode including the center pattern and the micro branch portions, and an upper unit electrode including the cross-shaped opening are included, decreased luminance is observed as a voltage of more than about 2 V is applied.

Figure 10:
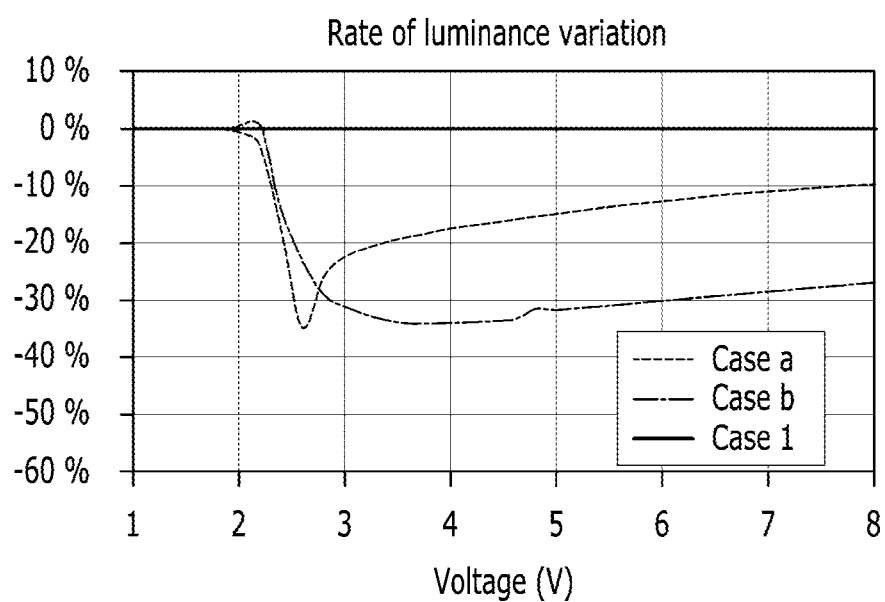
FIG. 10 is a graph illustrating rates of luminance variations for the exemplary embodiment and the comparative example.

According to the graph of FIG. 10, it is observed that constructing a display device according to the above described exemplary embodiments results in better-controlled luminance variation according to applied voltage, as well as suppression of texture generation.

Whether visible texture is a function of thickness of the passivation layer will now be described with reference to FIGS. 11 to 14.

Figure 11:
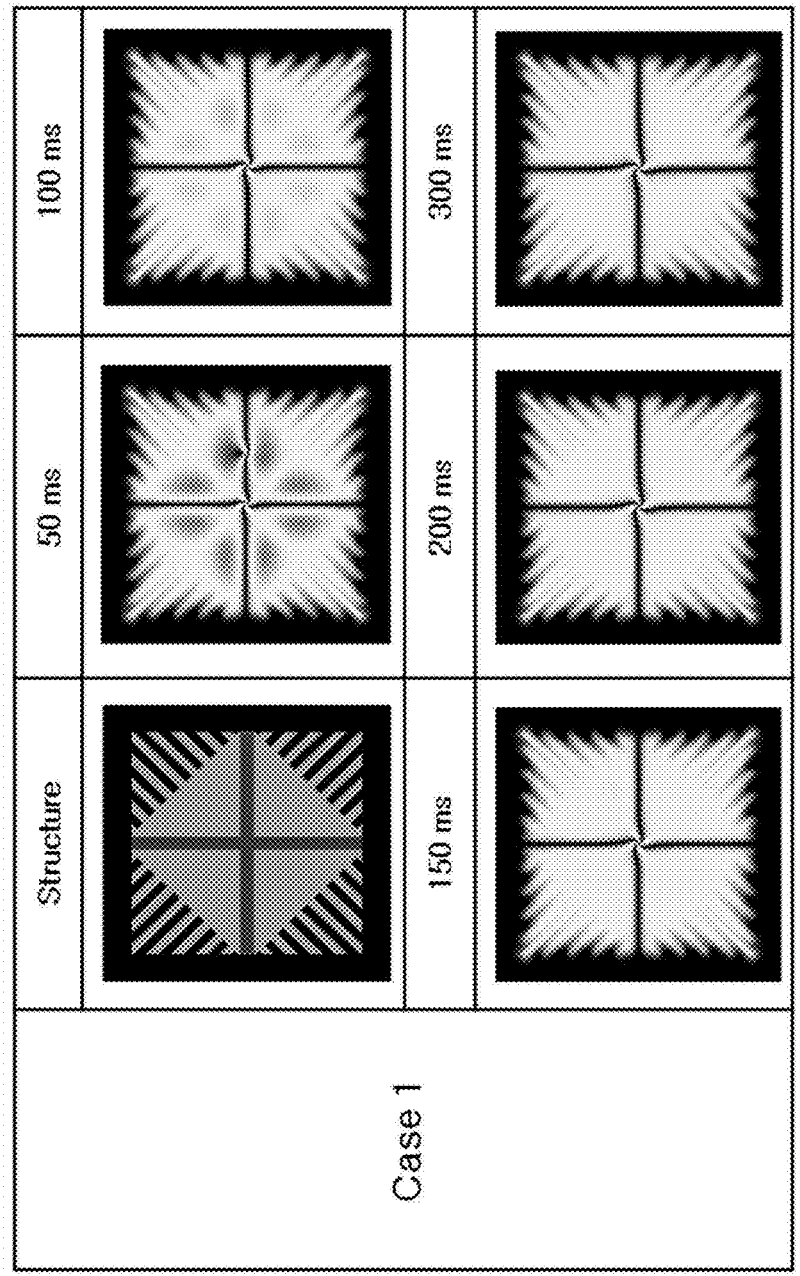
FIGS. 11, 12, and 13 are images of the unit electrodes in which a passivation layer has different thicknesses according to the exemplary embodiment of the present invention.
Figure 12:
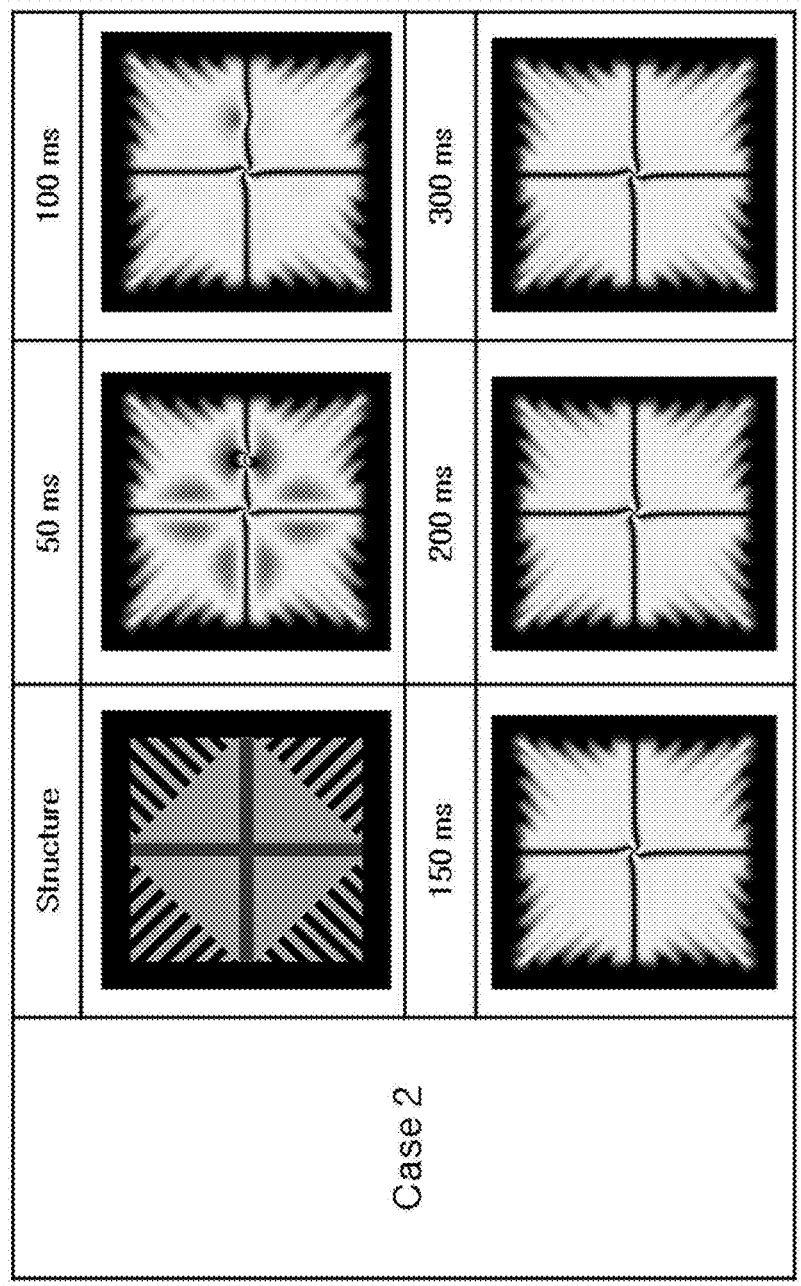
Figure 13:
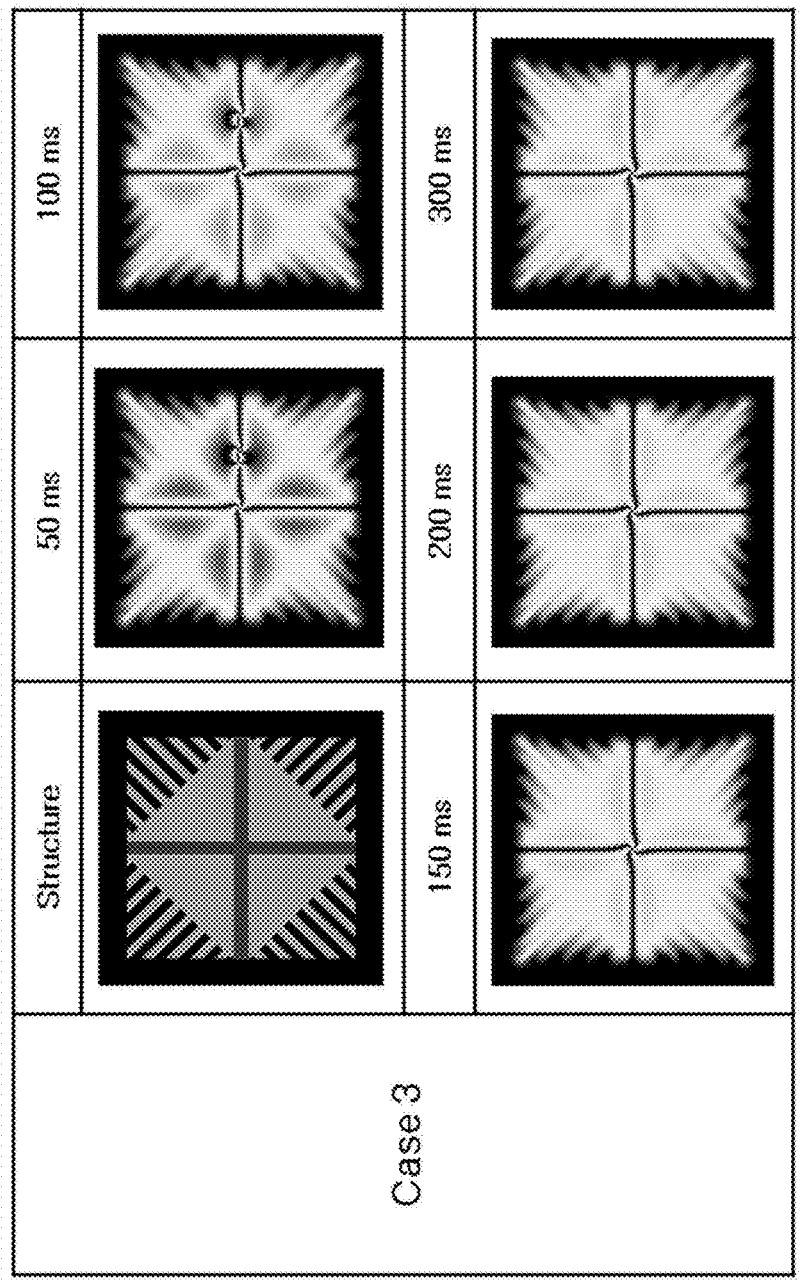
Figure 14:
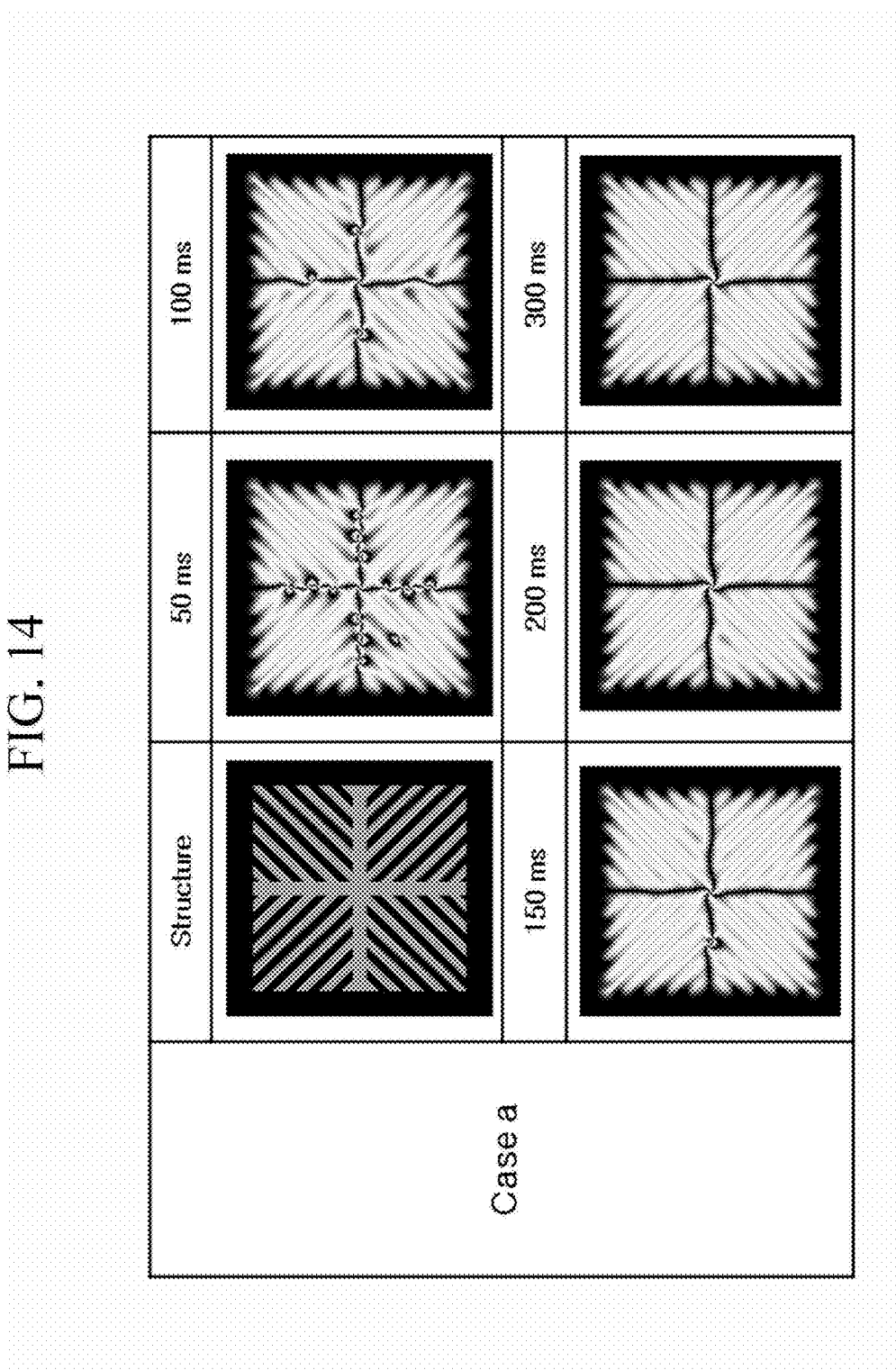
FIG. 14 is an image of texture generation for the comparative example.

FIGS. 11 to 13 are images of unit electrodes in which a passivation layer has different thicknesses according to an exemplary embodiment of the present invention, and FIG. 14 illustrates an image for a comparative example.

According to an exemplary embodiment of the present invention, FIGS. 11 to 13 respectively include the first lower plate unit electrode including the center pattern and the micro branch portion, and the second lower plate unit electrode including the cross-shaped stem portion. Furthermore, FIG. 11 shows a case 1 in which the thickness of the passivation layer between the first and second lower plate unit electrodes is 2000 Å, FIG. 12 shows a case 2 in which the thickness of the passivation layer is 4000 Å, and FIG. 13 shows a case 3 in which the thickness of the passivation layer is 6000 Å.

As in FIGS. 8A and 8B, FIG. 14 shows a case a that is a comparative example in which the lower plate unit electrode includes the cross-shaped stem portion and the micro branch portions but no center pattern is present, and in which the liquid crystal layer includes pretilts.

First, referring to FIG. 11, a small amount of texture is observed after about 50 ms have elapsed, but no texture is observed after about 100 ms have elapsed. Referring to FIG. 12, a small amount of texture is also observed adjacent to the cross-shaped stem portion after about 50 ms have elapsed, but no texture is observed after about 150 ms have elapsed. Similarly, referring to the exemplary embodiment of FIG. 13, a small amount of texture is observed adjacent to the cross-shaped stem portion after about 50 ms and 100 ms have elapsed, but no texture is observed after about 150 ms have elapsed. However, according to the comparative example of FIG. 14, a large amount of texture is observed adjacent to the cross-shaped stem portion after about 50 ms have elapsed, and the texture remains even after about 150 ms have elapsed.

That is, according to FIGS. 11 to 14, in a display device including a pixel electrode according to the exemplary embodiment of the present invention, it is observed that texture generation is suppressed relative to the configuration of FIG. 14 and within the above-described predetermined thickness range.

Figure 15:
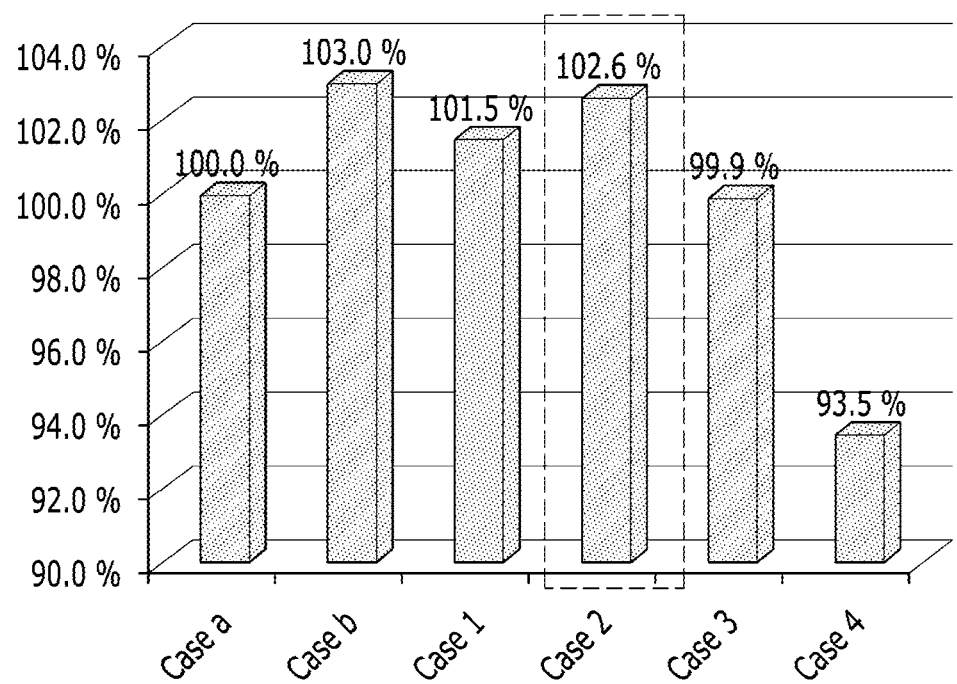
FIG. 15 is a graph illustrating transmittances of the exemplary embodiment and the comparative examples.

FIG. 15 is a graph illustrating transmittances of the exemplary embodiment and the comparative examples. Here, case a corresponds to the structure of FIGS. 8A and 8B, case b corresponds to the structure of FIGS. 9A and 9B, case 1 corresponds to a pixel structure like that of FIG. 11 where the thickness of the passivation layer is 2000 Å, case 2 corresponds to a pixel structure like that of FIG. 12 where the thickness of the passivation layer is 4000 Å, case 3 corresponds to a pixel structure like that of FIG. 13 where the thickness of the passivation layer is 6000 Å, and case 4 corresponds to a pixel structure according to the exemplary embodiment of the present invention where the thickness of the passivation layer is 9000 Å.

According to the graph of FIG. 15, the transmittance is different depending on the thicknesses of the passivation layer as well as the pixel structures. That is, even in the case of the pixel structure of the case 4 according to the exemplary embodiment of the present invention, the transmittance slightly decreases depending on the thicknesses of the passivation layer.

Figure 16:
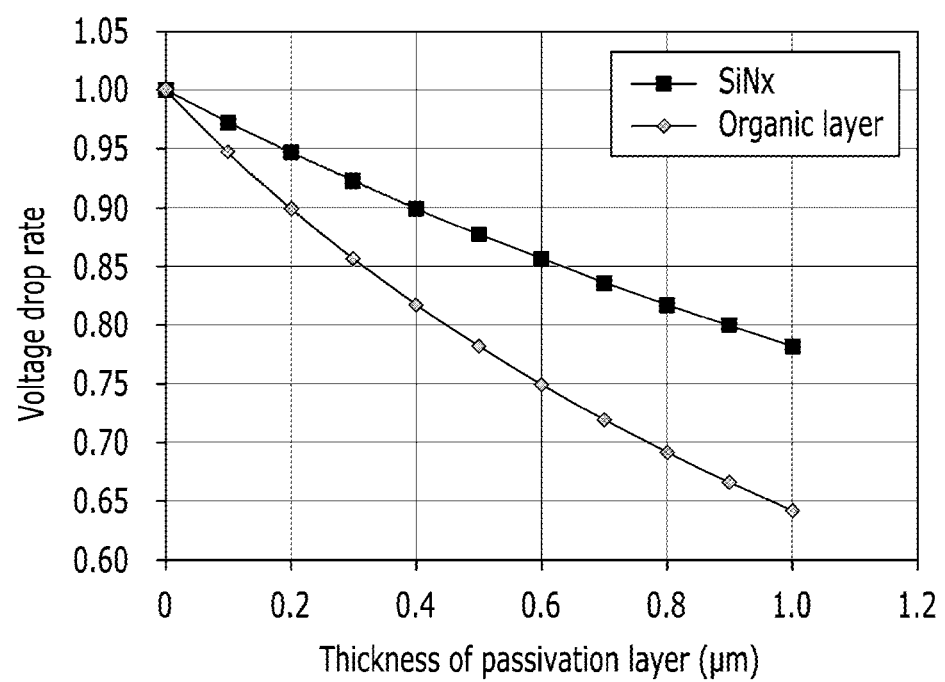
FIG. 16 is a graph of a voltage drop rate according to the thicknesses of the passivation layer.

According to FIG. 15, it can be seen that the present invention is partially affected by the thicknesses of the passivation layer as well as by the shape of the pixel electrode. Accordingly, the passivation layer according to the exemplary embodiment of the present invention may have a material or thickness in consideration of FIG. 16. FIG. 16 is a graph of a voltage drop rate according to passivation layer thickness.

First, it can be seen that a passivation layer formed of a silicon nitride has a voltage drop rate that is a function of its thickness. In this case, since the exemplary embodiment of the present invention may prefer a passivation layer having a voltage drop rate of about 0.80 to 0.95, the passivation layer may have a thickness of about 0.2 μm to 0.9 μm.

Meanwhile, when the passivation layer is an organic layer formed of a material other than a silicon nitride, it may have a voltage drop rate curve that is a function of the thickness and particular composition of the organic layer. In this case, the thickness of the organic layer (or passivation layer) may be determined such that the voltage drop rate is in the range of about 0.80 to 0.95. Thus, referring to FIG. 16, the organic layer having the voltage drop rate according to the exemplary embodiment may have a thickness of about 0.1 μm to 0.5 μm.

In the present specification, a silicon nitride and the predetermined organic layer are given as nonlimiting examples. Accordingly, the materials are not limited thereto and the thickness can be determined, and may vary, depending on the particular materials of the corresponding passivation layer.

Meanwhile, since FIG. 16 only illustrates the thicknesses of the passivation layer according to voltage drop rate, the transmittances shown in FIG. 15 may also be considered to determine the thicknesses of the passivation layer in the exemplary embodiment of the present invention. That is, the thickness of the passivation layer may be adjusted to have an appropriate value according to both voltage drop rate and transmittance.

Figure 17:
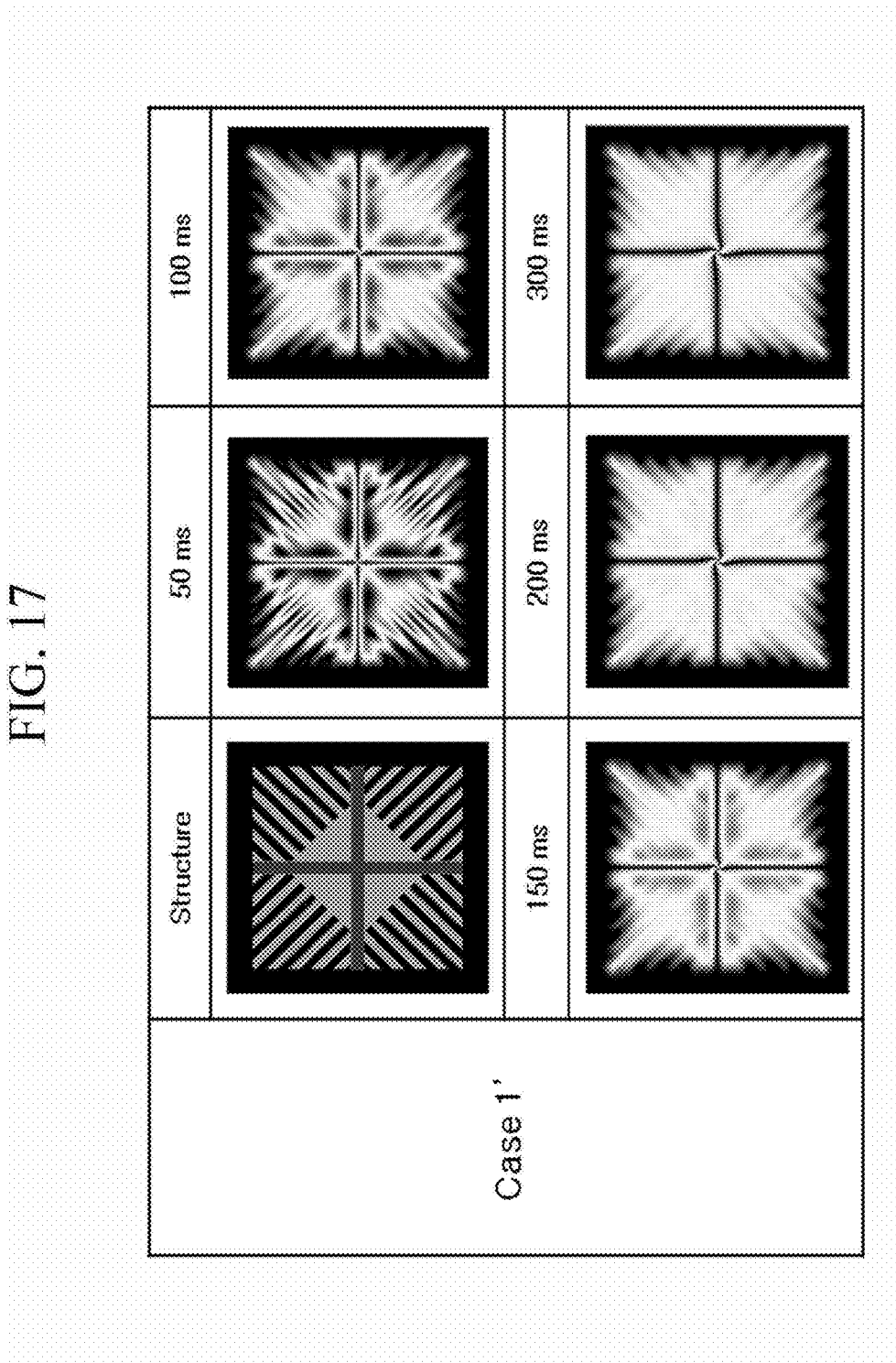
FIGS. 17, 18 and 19 are images of the unit electrodes in which the sizes of the center patterns are different according to the exemplary embodiment of the present invention.
Figure 18:
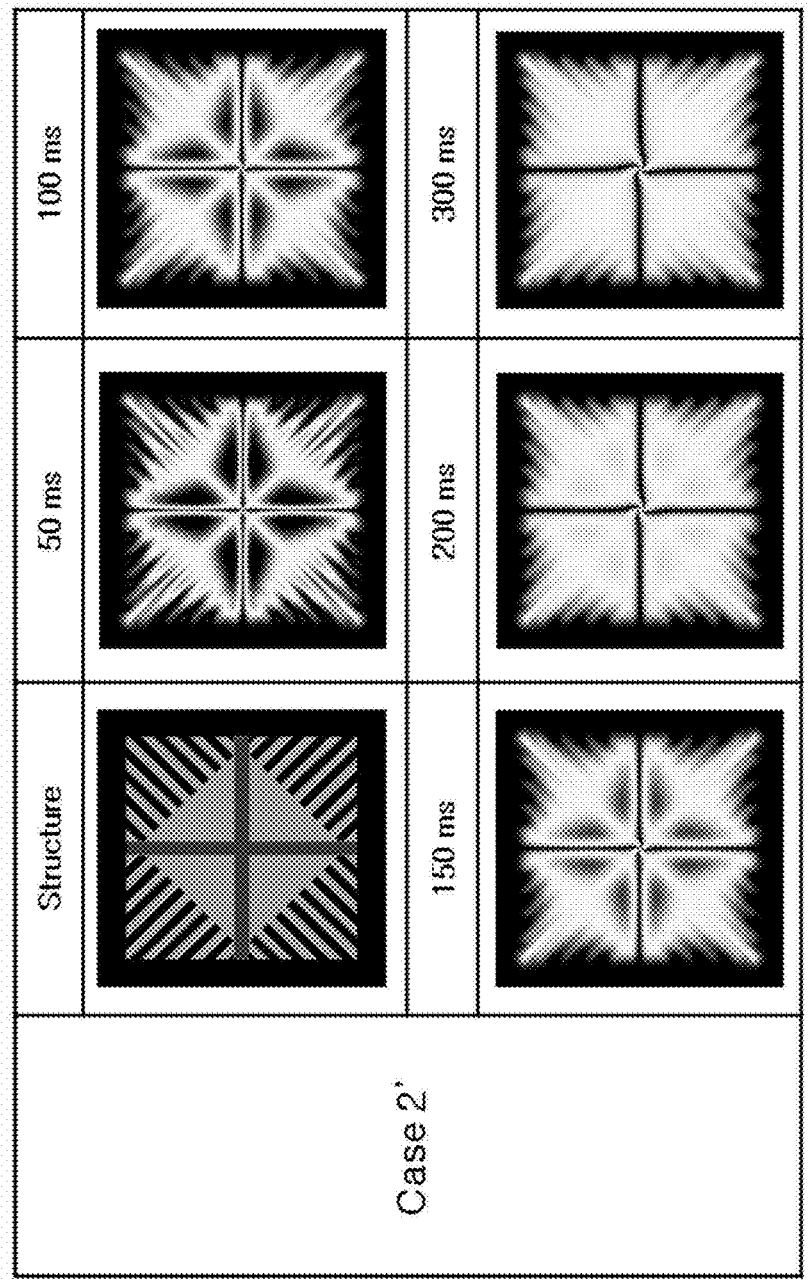
Figure 19:
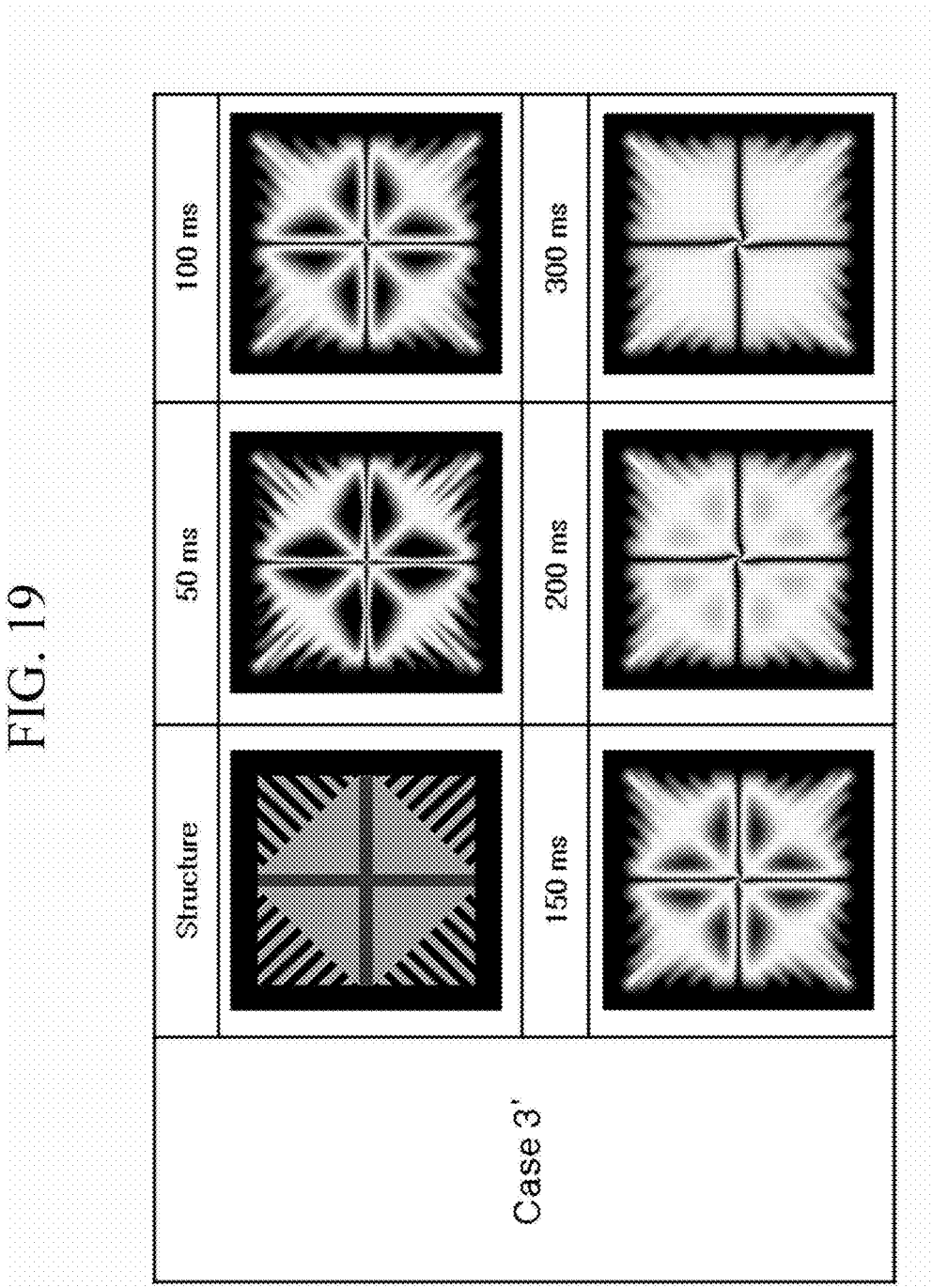

Images of texture generation according to a size of the center pattern will now be described with reference to FIGS. 17 to 20. FIGS. 17 to 19 are images of unit electrodes of differing center pattern size, and FIG. 20 is an image of texture generation for a comparative example.

A case 1' of FIG. 17 illustrates a case in which the first lower plate unit electrode includes a center pattern and micro branch portions, and the second lower plate unit electrode includes a cross-shaped stem portion. Also, the size of the center pattern corresponds to 30% of the size of the first lower plate unit electrode (i.e., the surface area of the center pattern is 30% of the total area outlined by outermost points of the first lower plate unit electrode).

Unlike case 1', a case 2' of FIG. 18 illustrates a case in which the size of the center pattern corresponds to 40% of the size of the first lower plate unit electrode, and a case 3' of FIG. 19 illustrates a case in which the size of the center pattern corresponds to 50% of the size of the first lower plate unit electrode.

Figure 20:
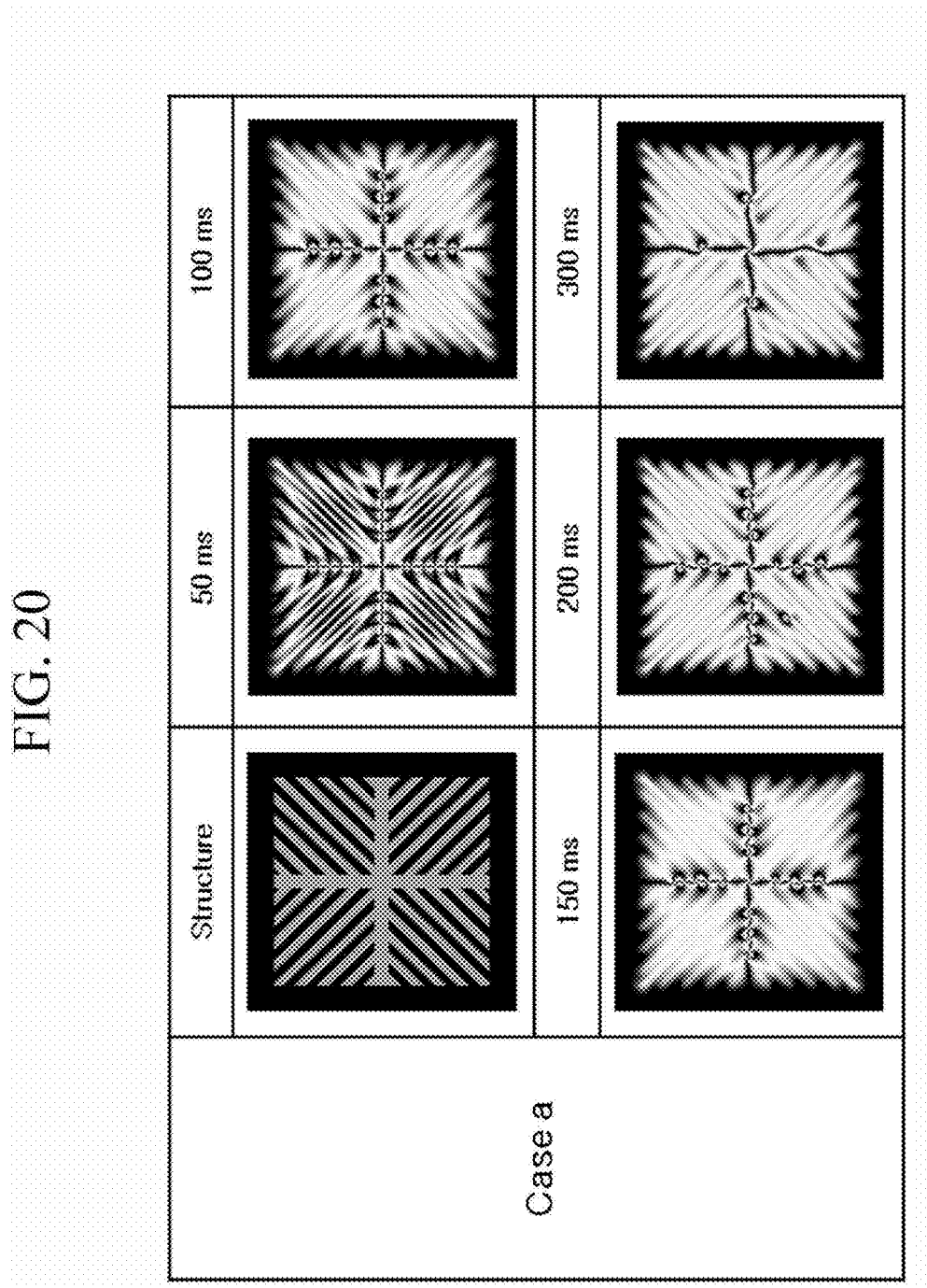
FIG. 20 is an image of the texture generation for the comparative example.

Like FIGS. 8A and 8B, a case of FIG. 20 illustrates a comparative example in which a cross-shaped stem portion and micro branch portions are included but no center pattern is present, and the liquid crystal layer is pretilted.

First, when FIGS. 17 to 19 are compared with FIG. 20, the cases 1' to 3' according to the exemplary embodiment of the present invention have slight texture generation, but some amount of texture is observed even after 100 ms, which is a considerable amount of time, have elapsed. That is, with the pixel structure according to the exemplary embodiment of the present invention, it is observed that texture generation is better controlled as compared to the comparative examples, and the amount of texture generation is stably suppressed without a significant difference when the size of the center pattern particularly corresponds to about 30% to 50% of the size of the lower plate unit electrode.

Since the liquid crystal layer according to the exemplary embodiment of the present invention includes no pretilt, there is no characteristic variation due to misalignment of the upper and lower substrates of the curved display device. In addition, since the upper plate electrode is formed to have a patternless planar shape (i.e. a single unitary, continuous body covering the entire subpixel without any cutouts therein), texture generation due to the misalignment can be controlled. Further, the lower plate unit electrode includes a cross-shaped stem portion, thereby allowing the liquid crystal molecules to be more stably controlled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of different embodiments and structures described herein can be mixed and matched in any manner, to form further embodiments and structures contemplated by the invention.

<Description of Symbols>

3: liquid crystal layer 31: liquid crystal
75: horizontal opening 77: vertical opening
78: central opening 95, 97: gap
100, 200: display panel <Description of Symbols>

121: gate line 124: gate electrode
140: gate insulating layer 171: data line
173: source electrode 175: drain electrode
180p, 180q, 180r: passivation layer 191: lower plate electrode
191a: first subpixel electrode 191b: second subpixel electrode
195: horizontal stem portion 197: vertical stem portion
198: center pattern 199: micro branch portion
192, 194a, 194b, 199a, 272: connecting portion
220: light blocking member 230: color filter
250: overcoat 270: upper plate electrode

What is claimed is:

1. A liquid crystal display (LCD) comprising:
a first insulation substrate;
a thin film transistor disposed on the first insulation substrate and connected to a gate line, a data line and a drain electrode,
a lower pixel electrode comprising a first lower pixel electrode and a second lower pixel electrode disposed on the data line;
a passivation layer disposed between the first lower pixel electrode and the second lower pixel electrode,
a second insulation substrate facing the first insulation substrate;
an upper electrode disposed on the second insulation substrate and facing the lower pixel electrode; and
a liquid crystal layer disposed between the lower pixel electrode and the upper electrode,
wherein
the first lower pixel electrode includes a central pattern having a solid rhombus shape and a plurality of micro branch portions that are coupled to the central pattern, wherein the plurality of micro branch portions extend in different directions; and
the second lower pixel electrode comprises a cross shape stem portion and is connected to the first lower pixel electrode,
and
a center of the first lower pixel electrode and a center of the second lower pixel electrode are overlapped with each other and the LCD is curved.

2. The LCD of claim 1, wherein the first and second lower pixel electrodes are each configured to have a same voltage applied thereto.

3. The LCD of claim 2, wherein the first and second lower pixel electrodes are electrically connected through one or more contact holes.

4. The LCD of claim 2, wherein the passivation layer satisfies the following:

$$\frac{V_{lc}}{V_{applied}} = \left(1 + \frac{d_p/d_{lc}}{\varepsilon_p/\varepsilon_{lc}}\right)^{-1}$$

wherein $V_{lc}$ is an effective voltage of the liquid crystal layer, $V_{applied}$ is a voltage applied to the liquid crystal layer, $d_p$ is a thickness of the passivation layer, $d_{lc}$ is a thickness of the liquid crystal layer, $\varepsilon_p$ is a dielectric constant of the passivation layer, and $\varepsilon_{lc}$ is a dielectric constant of the liquid crystal layer.

5. The LCD of claim 4, wherein the passivation layer has a voltage drop rate (Vlc/Vapplied) of less than about 0.8 to 0.95.

6. The LCD of claim 5, wherein a thickness of the passivation layer is about 2000 Å to 9000 Å.

7. The LCD of claim 6, wherein the passivation comprises silicon nitride ($SiN_x$).

8. The LCD of claim 1, wherein a size of the central pattern corresponds to about 30% to 50% of the size of the lower pixel electrode.

9. The LCD of claim 1, wherein the second lower pixel electrode comprises the cross-shaped stem portion, which has a width of about 3 μm to 10 μm.

10. The LCD of claim 1, further comprising a pixel area, wherein the pixel area includes a plurality of the unit regions, and further includes a first subpixel and a second subpixel configured to respectively transmit light at identical or different luminance for one input image signal, the first and second subpixels each include at least one of the lower pixel electrode and at least one of the upper electrode, and the number of the lower pixel electrodes included in the second subpixel is greater than the number of the lower pixel electrodes included in the first subpixel.

11. The LCD of claim 10, wherein the first and second subpixels are spaced apart from each other with the gate line interposed therebetween.

12. The LCD of claim 10, wherein the thin film transistor includes a first thin film transistor coupled to the first subpixel, and a second thin film transistor coupled to the second subpixel.

13. The LCD of claim 1, further comprising a color filter and a light blocking member that are disposed on the data line.

14. The LCD of claim 1, wherein the upper electrode is a single unitary, continuous structure.

* * * * *